UNITED STATES PATENT OFFICE.

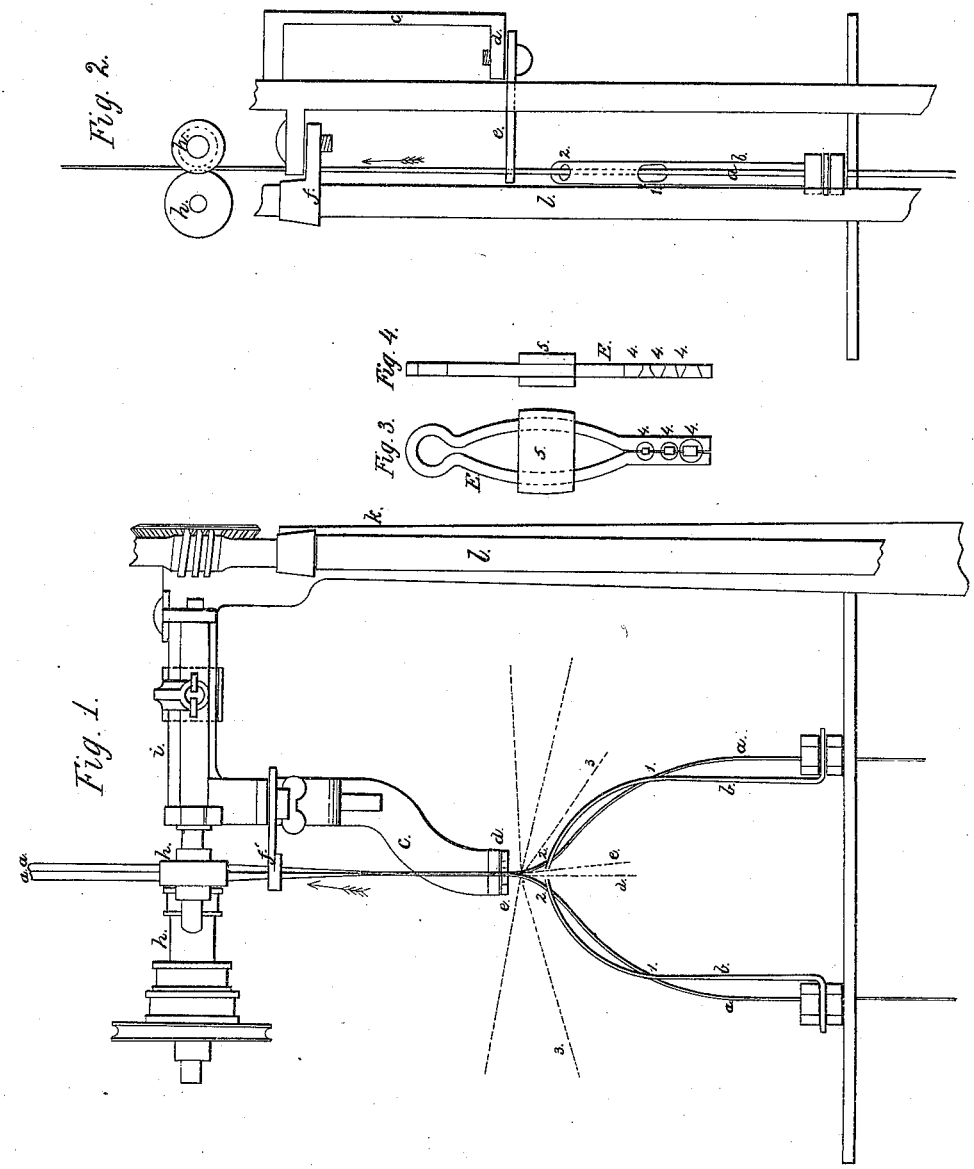

OLIVER R. BURNHAM, OF NEW YORK, N. Y., ASSIGNOR TO J. I. WEST AND J. O. WEST.

IMPROVEMENT IN BRAIDING MACHINE FOR COVERING SKIRT AND OTHER WIRES.

Specification forming part of Letters Patent No. 47,487, dated April 25, 1865.

*To all whom it may concern:*

Be it known that I, OLIVER R. BURNHAM, of the city, county, and State of New York, have invented certain new and useful improvements in apparatus for covering skirt or other Wire where two or more wires are braided together with braid by the ordinary braiding-machines; and I do hereby declare that the following is a full and exact description of my said improvements, reference being had to the drawings accompanying and making part of this my specification.

My invention consists of an attachment of apparatus to the ordinary braiding-machine for covering wire with braid, and is applicable where two wires are to be covered at the same time with braid, the wires being covered with braid while parallel and side by side, and the wires are to be afterward turned and used edge to edge, and when used in skirts are used as set forth in Letters Patent of the United States granted to me and dated 25th March, 1862, for improvement in skirt-hoops, and numbered 34,737; but I do not intend to confine my invention to such particular use, but it has reference to all kinds of braided wire where two or more wires are braided together and afterward turned edge to edge for use.

In the accompanying drawings, Figure I is a front elevation of the apparatus or attachment constituting my improvements. Fig. II is a side elevation of the same. Fig. III is a top view of an elastic guide-finger, or forceps, through which the braided wires are conducted and supported when braided preparatory to their being turned edge to edge. Fig. IV is a cross-section of Fig. III longitudinally, at its center line.

In all the figures the same letters and figures refer to the same parts.

The apparatus is supposed in the drawings to be attached to the braiding-machine of the ordinary construction with such number of bobbins as may be required, the braiding-machine and bobbins not being represented in the drawings, as they form no part of my invention.

The two wires to be braided are shown in the drawings, Fig. I, at $a\ a$. They are unwound as wanted from two reels underneath the braiding-machine prepared for the purpose. The two wires are passed through two apertures in two upright curved guide-pieces, $b\ b$, meeting nearly together at the top. The wires pass, first, from the outer side of the guide-piece to the under side, and then from the under side to the outer side to the point where they receive the braid. The lower apertures in the guide-pieces are elongated vertically and beveled so as to admit the easy and unobstructed passage of the wires upward, as shown at 1, in Fig. II, the upper apertures, 2 2, being adapted in shape to the form of the two wires and beveled, and the apertures are all made large enough to permit the unobstructed passage of the wires and their enlargements at their joints. The braiding-threads from the bobbins or spools are represented by the lines 3 3 3, Fig. I. The guide-pieces $b\ b$ are so arranged that the threads unwinding from the bobbins pass over their tops, and the bobbins in their revolutions pass underneath the tops of the guide-pieces, and the braiding is produced and completed just above where the two guide-pieces approach each other and end, and just before the wires are brought together side by side, as next herein described. From the frame-work above the bobbins descends the arm or bracket $c$, made of iron or other suitable metal (as are all the parts except the bobbins) bent, as shown in the drawings, so as to carry at its lowest end a horizontal bearing, $d$, Figs. I, II, and so arranged as not to obstruct the vertical ascent of the wires as the braiding is performed.

Attached to the bearing $d$ by a thumb-secrw and slot, so as to be adjustable, is the elastic guide-finger $e$, Figs. I, II, which is shown in detail in plan and section in Figs. III, IV. This is placed horizontally upon the bearing $d$. It is constructed with the parts separate at one end and closed at the other end by a bend like a spring-forceps, and tempered at the bend, so as to give an elastic action to the ends, to admit the unobstructed passage of the wires and of their enlargements at the joints. Upon the interior surfaces of the fingers or prongs of the piece $e$ are recesses corresponding to each other, so as to form together an aperture resembling the shape of the two braided wires when together side by side. There are several of these apertures in the guide-piece $e$ (shown at 4 4 4) of different sizes, to suit different sizes of wires. These apertures or recesses are beveled above and beneath, so as not to catch the wires or joints or wear the braid, and, in connection with the elasticity of the prongs, to give the braids and joints an unobstructed and continuous passage vertically, according to the movement of the braiding operation. The guide-piece $e$ may have an elastic band of india-rubber, as shown at 5 5, Figs. III, IV, which may alone constitute the spring or act as an auxiliary. Above the guide-piece $e$, vertically and attached to a bracket, $f$, by a thumb-screw and slot, is another guide-piece, $f'$, through an aperture in which the wires ascend as they are braided, and which assists in the process of turning the wires from the position in which they were braided, side by side, to that of being placed edge to edge. This is accomplished as fast as the wires ascend from being braided by the guide and delivery rollers $h\ h$, placed and operating vertically above $f'$, and which rollers are placed together so as as to give pressure upon the wires and braids and flatten them edge to edge, and at the same time hold the wires in place and carry them off as the operation is completed. These pressure and delivery rollers $h\ h$ have their bearings on the horizontal frame-work $i$, which is fast to the upright standard K, upon which rotates the vertical spindle $l$, and which has its bearings and support in brackets attached to the standard in any convenient manner, and is driven by gearing at the bottom, connected with the shafting, and is geared at the top into a bevel-wheel, by which the pressure and delivery rollers are operated.

From the manner in which the braid is laid upon the two wires lying parallel and contiguous as they are braided, it follows that when the wires are turned from this position outward, so as to be edge to edge, as above described, the braid becomes tightly strained upon the wires, and the wires thereby become firmly fixed in their position of edge to edge, so as to retain that position while in use.

What I claim as my invention in the foregoing, and for which I claim Letters Patent, is—

1. The uniting by a braided covering of the wires, held separately and apart until the point of braiding, and the bringing them together at that point so as to braid them just before or as they are brought together side by side or parallel, and then the turning them edge to edge during the continuous movement of the wires so as to strain and tighten the braid upon the wires, as described.

2. The construction and use of the guide and supporting pieces $b\ b$, with the apertures in the same for the passage of the wires, by which the wires are supported and directed to the point of braiding without interfering with the motion of the bobbins or threads, in the manner and for the purposes described.

3. The guide-piece $e$, constructed and operating in the manner and for the purposes described, by which the wires are brought and kept together, as they ascend, at the required point for braiding, and at the same time the continuous and unobstructed passage of the wires and their joints is provided for as the braiding proceeds and is completed.

4. The application and use of the pressure and delivery rollers, whether with or without the guide-piece $f'$, combined with the apparatus above described underneath, by the combined operation of which the wires are turned edge to edge by a gradual progress from their position of side by side at the same time that they are conducted away as completed.

OLIVER R. BURNHAM.

Witnesses:
 EDWIN F. CAREY, Jr.,
 J. B. STAPLES.